Aug. 13, 1929. B. McCOLLUM 1,724,720
METHOD AND APPARATUS FOR STUDYING SUBSURFACE CONTOURS
Original Filed Oct. 12, 1923

Burton McCollum
INVENTOR

Patented Aug. 13, 1929.

1,724,720

UNITED STATES PATENT OFFICE.

BURTON McCOLLUM, OF WASHINGTON, DISTRICT OF COLUMBIA, ASSIGNOR TO McCOLLUM GEOLOGICAL EXPLORATIONS, INC., A CORPORATION OF DELAWARE.

METHOD AND APPARATUS FOR STUDYING SUBSURFACE CONTOURS.

Application filed October 12, 1923, Serial No. 668,245. Renewed September 8, 1927.

My invention relates to methods of determining the contour of subterranean strata or boundaries of geologic formations and has among its objects the study of subsurface geological conditions at depths greater than can be conveniently and economically reached by means heretofore available. My invention is particularly adapted to determining the location of deposits of certain valuable minerals, mineral oils, and other valuable deposits which are more or less definitely related to subsurface geological conditions. My invention depends upon the broad principle of sending sound waves down into the portions of the earth to be studied and measuring the time intervals required for certain components of these sound waves to travel through certain well defined paths. These time intervals being known and the velocity of sound in the various subterranean rocks being determined once for all, the distances traveled by these sound components can then be determined. By properly utilizing this principle in the manner described below, I am able to determine much valuable information regarding the character and contour of the subsurface formation. Numerous attempts have been made heretofore to apply this principle, but owing to the difficulties described later, these attempts have not been successful. I have now discovered means of overcoming these difficulties and it is these discoveries that form the basis of the present specifications.

My invention is fully described in the following specification, reference being made to the accompanying drawings.

Figure 3:
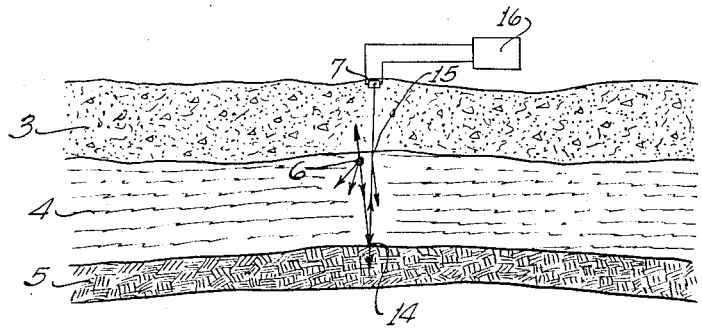

Fig. 3 serves to illustrate important features of my invention whereby I overcome certain natural difficulties and obstacles.

For the sake of clearness and brevity my invention is described below with particular reference to but one of its practical applications, namely, the study and the determination of the contours of subsurface sedimentary formations. It will readily be seen, however, that the method may be applied to determine geological contours under a great variety of other conditions.

It is well known that in regions where deposits of oil or gas may be encountered, these deposits are not distributed generally throughout the area but are highly localized in pools occupying a relatively small portion of the total area. The location of these pools are governed by a well known geological principle, namely, that they are associated with the anticlinal folds of the subsurface sedimentary rocks. A problem of great practical importance, therefore, is the determination of the location of these anticlinal folds and this is one of the important applications of my invention.

It will readily be seen that if one determines the direction of the slope of the rocks with respect to horizontal at various places, any reversal of the direction of this slope will mark the presence of an anticlinal or synclinal fold and a knowledge of the direction of the slope of either side of the fold will show also whether the fold is anticlinal or synclinal. The direct object of my invention, therefore, is the determination of the slope of subsurface strata by determining their depths at various points in any desired locality.

Figure 1:
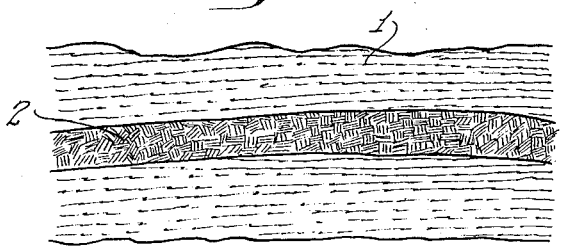
Fig. 1 is a diagram illustrating in their simplest form the conditions with which we have to deal.
Figure 2:
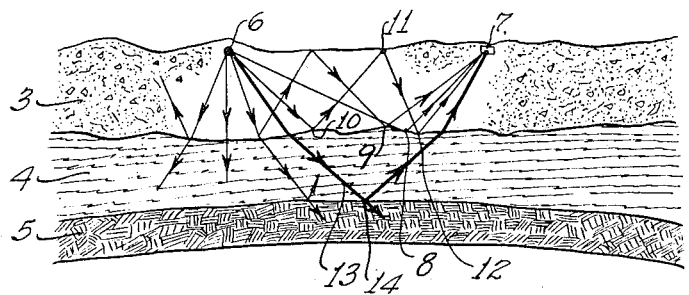
Fig. 2 illustrates certain practical conditions which are usually encountered in certain important applications of my invention.

Fig. 1 shows in its most simple and elementary form the nature of the problem with which we have to deal. Here a layer of surface rocks 1 overlies a layer of a different sedimentary rock 2. In general it is well known that in most cases the surface contour of the rock layer 1 bears no definite relationship to the contours of the subsurface strata, but that in general certain deeper rock layers 2, which in the case under consideration are more frequently of limestone or sandstone, the contours offer a fairly definite criterion of the contours of still deeper strata with which the oil deposits are associated. In the simplest form, therefore, the problem is one of determining the direction of the slope in any desired locality of the rock layer 2. This simple condition here described, however, is one which very seldom occurs in practice. In most cases the conditions are substantially equivalent to those shown in Fig. 2. Here a minimum of three geologic zones have to be taken into consideration. On the surface there is usually a layer of soil 3, comprising more or less completely disintegrated rock or unconsolidated deposits the depth of which varies greatly from point to point. Beneath this there is usually a zone 4 comprising unweathered shales and this in turn is underlaid by a rock layer 5, the slope of which it is desired to determine. Numerous investigators have attempted to study such geological conditions by what is known as the echo method, namely, by sending a sound wave down from the surface and measuring the time elapsing between the start of the transmitted wave and the arrival at the surface of a reflection or echo from the rock layer 5. This method, however, has failed to give reliable results under the practical conditions here disclosed. One reason for this is that the depth of the surface layer 3 is not only decidedly variable from point to point, but the velocity of sound in this layer is likewise extremely variable and uncertain. Variations of the velocity occur with depth and degree of disintegration of the rocks, moisture content, character of soil, and various other factors. Because of these variables the time intervals required for sound to go through these surface layers are difficult to determine with sufficient accuracy for practical purposes. Furthermore, the velocity of sound in this weathered layer is usually extremely low in comparison with the velocity in the unweathered rocks, so that the uncertain time interval required for the sound to travel through the surface layer forms a very large proportion of the total time for the sound to reach the rock layer 5 and return. Consequently it becomes out of the question to use this simple echo method under these conditions. I have discovered that the failures made in the past are due chiefly to this uncertain weathered layer, and have devised means and methods whereby the difficulties inherent in the echo method as heretofore used are entirely avoided and it is the means whereby I accomplish this that forms the subject of this specification.

Referring again to Fig. 2, let us suppose that a source of sound is placed at any point 6 near the surface, and a detector of sound waves at any point 7, likewise near the surface. This represents the procedure that has heretofore been followed in attempting to utilize sound waves for exploring subsurface geology. It will be evident that the sound waves traveling downward in all directions will encounter the boundary between the surface layer 3 and the subsurface layer 4 at which point a portion of the energy is reflected back as indicated by the arrows. I have found by experiment that the acoustic properties of the weathered surface layers corresponding to 3 differ radically from the corresponding properties of the unweathered rocks or shales 4. As a result of this it has been found that nearly all of the sound energy from the source 6 is reflected back at the top of the rock layer 4. This reflected energy is again reflected back downward from the surface and again upward at the boundary between 3 and 4, thus giving rise to an indefinite series of reflections from the top and bottom of the weathered layer 3. It will be evident that all of these numerous reflected waves will actuate the sound detector placed at 7. Furthermore, it will be seen that those waves which reach the detector 7 after a single reflection, as at the point 8, will reach the detector at a different time from the reflection at the point 9, because of the difference in the length of the path. Also as just pointed out, a reflected wave may reach the detector 7 after three reflections as at the point 10, then at the point 11, and again at the point 12. Obviously this disturbance reaches the detector at a considerably later time than either of the two foregoing. Similarly other reflected waves follow at still later times due to their having been reflected a greater number of times before reaching the detector 7. To add to the difficulty these reflected waves do not reach 7 as a series of detached pulses, the time intervals of which bear any definite relation to each other, on account of the irregularity of the boundary within the weathered layer 3 and the rock layer 4. In consequence of the foregoing phenomena the detector at 7 will continue to be disturbed for a prolonged interval by a series of sound waves depending wholly on the acoustic properties, form and dimensions of the weathered layer 3 which, as is well known, bears no relation whatever to the depth or contour of the rock layer 5 which it is desired to determine. While it is true that a small part of the energy from the source does go down through the rock layer 4 as indicated by the arrow 13, and in turn a fraction of this is reflected back toward the detector at the point 14 from the boundary surface between 4 and 5, the intensity of these waves is so small in comparison with the waves reflected back from the boundary between 3 and 4, that they are entirely obscured by the complex series of phenomena taking place due to reflections at the base of the weathered layer. It is not, therefore, in general possible to identify on a graphic record those waves which are reflected back from the rock layer 5 under investigation.

I have discovered that the difficulties above described can for practical purposes be completely overcome by placing either the source of sound or the detector down in the unweathered rock zone 4. The basic principle of my invention will be understood by reference to Fig. 3. Suppose for example, that the source is placed at the point 6 just below the boundary between the weathered layer 3 and the rock layer 4 and the detector placed at a point 7 near the surface as shown. It will be apparent that a sound wave sent out from the source 6 will tend to go in all directions, but that the portion which starts upward will be in large part immediately reflected backward from the surface of the weathered layer 3. If the point 6 is very close to this boundary surface the reflected wave will be practically superposed on the direct wave starting in a downward direction, so that most of the energy radiated from the source 6 will go downward toward the rock layer 5. A certain small portion of the energy, however, will pass across the boundary into the weathered layer 3 and be transmitted upward, thus actuating the detector at 7. Any particular beam of the wave striking the rock layer 5 at any point 14 will in part be reflected backward. When this reflected wave strikes the boundary surface between 3 and 4 at the point 15, there will, of course, be a considerable part of this energy again reflected back in a downward direction. However, a certain portion will be transmitted through the weathered layer 3 and will actuate the detector 7. The problem now is to determine the depth of the rock zone 4 between the source 6 and the point of reflection 14. Considering now the time as zero when the sound wave starts from the source 6, the first direct wave reaching the detector 7 will arrive there after a lapse of time $t_1$ which is the time required for the sound to travel through the weathered layer 3. Therefore $$t_1 = \frac{d_1}{v_1} \quad (1)$$

where $d_1$ is the depth of the weathered layer 3 and $v_1$ is the average velocity of sound therein. This wave will be reflected downward from the surface and again upward from the bottom of the weathered layer 3 actuating the detector a second time after an interval twice that required for the first wave to reach the detector, or the difference in time of arrival of these two waves will be $2t_1$ and it is evident that the detector will be actuated recurrently at intervals of $2t_1$ until the energy of the wave is finally dissipated. Similarly, the wave traveling downward reaches the rock layer 5 after a time interval $$t_2 = \frac{d_2}{v_2} \quad (2)$$

where $d_2$ is the depth of the rock layer 5 below the detector 6, and $v_2$ is the velocity of sound in the rock layer 4. The reflected wave will again pass up to the source after an additional lapse of time $t_2$, and finally reach the detector 7 after a further lapse of time $t_1$, making a total time of travel for this wave prior to its first arrival at the detector of $$t_1 + 2t_2 = t_1 + \frac{2d_2}{v_2} \quad (3)$$

It is evident, therefore, that the difference in time of arrival between the first direct wave leaving the source 6 and the first reflected wave from the point 14 will be $$t_1 + \frac{2d_2}{v_2} - t_1 = \frac{2d_2}{v_2} \quad (4)$$

If the detector 7 is connected to any suitable recording device 16 of which there are many well known types both mechanical and electrical, the time elapsing between the time of arrival of the various waves can be readily determined by means too well known to require description here. The time interval between the arrival of the first direct wave and the first reflected wave at the point 14 or any subsequent pair of similar events being thus determined as described above, and the velocity $v_2$ of sound in the rock zone 4 having been determined, the distance $d_2$ between the source 6 and the point of reflection 14 can be directly calculated. This operation can be repeated at any number of points within the region under investigation and when the depth of the rock layer 5 has been determined at a sufficient number of points, its slope and contour is determined.

In practice it is not necessary to determine the actual velocity $v_2$ of sound in the rock layer 4, although as explained, this can be done if desired. We can merely compare the time intervals as shown by the record at various stations. It will readily be seen that these time intervals will be proportional to the depth of the rock layer 4, as my experiments have shown that the velocity $v_2$ can be relied on to be substantially constant under conditions of practice, throughout any area of the size ordinarily to be investigated.

It will be evident that the positions of the source and the detector may be interchanged if desired, but I prefer the arrangement shown.

In Fig. 3 the relative position of sound source and detector as shown is such that the path of the reflected wave makes a comparatively small angle with the path of the direct wave. This is very advantageous as experiment shows that under this arrangement the various events on the record are simpler in form and more sharply defined, and further, the geometrical solution of the problem is much simpler. I prefer to place the source 6 nearly on a line normal to the surface of the rock layer 5 and passing through the detector 7 as in this way the best records are obtained. For practical purposes this means that the source and detector should be placed nearly on a vertical line, since in practice the rock layer will be nearly horizontal. I have found that in practice it is best to make the angle of incidence of the reflected wave so small that its cosine is at least eighty-five hundredths, and preferably larger.

I claim:

1. The method of determining the slope of a subsurface rock layer which is overlaid by undisintegrated rocks covered in turn by an unconsolidated stratum, said method comprising the placing of a source of sound in one of the said overlying strata, and a detector of sound waves in the other of the said overlying strata, and in known position relative to said source, sending a sound wave out from the said source, measuring the time interval between the arrival of sound waves at the detector due to direct transmission from the said source and to reflection from the said subsurface rock layer, repeating the operation at any desired number of points, and determining the slope from the relative time intervals at the several locations.

2. The method of determining the slope of a subsurface rock layer which is overlaid by a layer of undisintegrated rocks covered in turn by an unconsolidated stratum, said method comprising the placing of a source of sound at known depth down in the said overlying undisintegrated rock layer, and a detector of sound waves in the said unconsolidated stratum, sending a sound wave out from the said source, measuring the time interval between the arrival of sound waves at the said detector due to direct transmission from the said source, and to reflection from the said subsurface rock layer, calculating the depth of the said rock layer from the said time measurement, and the known velocity of sound in the said overlying undisintegrated rocks, and repeating this operation at any desired number of points to give the said contour to be determined.

3. The method of determining the slope of a subsurface rock layer which is overlaid by a layer of undisintegrated rocks covered in turn by an unconsolidated stratum, said method comprising the placing of a source of sound at known depth down in the said overlying undisintegrated rock layer, and a detector of sound waves in the said unconsolidated stratum, in such position with respect to the sound source that the cosine of the angle of incidence on the said subsurface rock layer of the wave reflected therefrom to the said detector, shall be at least eighty-five hundredths, sending a sound wave out from the said source, measuring the time interval between the arrival of sound waves at the said detector due to direct transmission from the said source, and to reflection from the said subsurface rock layer, and comparing this time interval with similar time intervals taken under similar conditions at other points along the surface, to give the relative depth of the said subsurface rock layer at the several points of measurements.

4. In the art of determining the slope of a subsurface rock layer overlaid by undisintegrated rocks covered in turn by an unconsolidated stratum, the method which comprises transmitting wave energy from a source in one of said overlying strata and measuring at a point in another of said overlying strata the time interval between the arrival of wave energy directly from said source and of wave energy reflected from said subsurface rock layer.

5. In the art of determining the slope of a subsurface rock layer overlaid by undisintegrated rocks covered in turn by an unconsolidated stratum, the method which comprises transmitting wave energy from a source in one of said overlying strata and measuring at a point in another of said overlying strata the time interval between the arrival of wave energy directly from said source and of wave energy reflected from said subsurface rock layer, the paths of said direct and reflected wave energies being substantially coincident.

In testimony whereof I affix my signature.

BURTON McCOLLUM.